US011613968B2

(12) United States Patent
Almajid et al.

(10) Patent No.: US 11,613,968 B2
(45) Date of Patent: Mar. 28, 2023

(54) METHODOLOGY TO INCREASE CO2 SEQUESTRATION EFFICIENCY IN RESERVOIRS

(71) Applicant: SAUDI ARABIAN OIL COMPANY, Dhahran (SA)

(72) Inventors: Muhammad M. Almajid, Dhahran (SA); Zuhair AlYousif, Saihat (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/463,110

(22) Filed: Aug. 31, 2021

(65) Prior Publication Data

US 2023/0062001 A1    Mar. 2, 2023

(51) Int. Cl.
*E21B 41/00* (2006.01)
(52) U.S. Cl.
CPC ................. *E21B 41/0064* (2013.01)
(58) Field of Classification Search
CPC .................................................. E21B 41/0064
See application file for complete search history.

(56) References Cited

U.S. PATENT DOCUMENTS

| | | | |
|---|---|---|---|
| 3,330,352 A | 7/1967 | Bernard | |
| 4,715,444 A | 12/1987 | MacAllister et al. | |
| 7,043,920 B2 | 5/2006 | Viteri et al. | |
| 2010/0012331 A1* | 1/2010 | Larter | E21B 43/243 166/401 |
| 2011/0056373 A1* | 3/2011 | Baxter | B01D 53/62 95/213 |
| 2012/0125616 A1 | 5/2012 | Graue | |
| 2013/0068470 A1 | 3/2013 | Poindexter et al. | |
| 2013/0074943 A1* | 3/2013 | Cloeter | B01F 25/3131 137/896 |
| 2021/0062630 A1* | 3/2021 | AlYousif | C09K 8/584 |

FOREIGN PATENT DOCUMENTS

CA    2650617 C    8/2012

OTHER PUBLICATIONS

Grimstad et al., "CO2 storage with mobility control", GHGT-14, 14th International Conference on Greenhouse Gas Control Technologies, Oct. 2018 (14 pages).

(Continued)

*Primary Examiner* — Silvana C Runyan
(74) *Attorney, Agent, or Firm* — Osha Bergman Watanabe & Burton LLP

(57) ABSTRACT

A method for increasing CO2 sequestration efficiency in depleted reservoirs by increasing injectivity is provided. This method includes the steps of introducing a surfactant solution into an upper portion of the reservoir through an injection well and introducing CO2 to a lower portion through another injection well such that the CO2 and surfactant solution migrate away from the wells and intimately intermingle to form CO2-based foam in situ. The surfactant solution and CO2 may also be introduced through the same injection well, where the surfactant solution is introduced to an upper portion of the reservoir and the CO2 is introduced into a lower portion. The pressure may be maintained at a value less than the fracture pressure of the reservoir utilizing a pressure relief well.

13 Claims, 2 Drawing Sheets

(56) References Cited

OTHER PUBLICATIONS

Okwen et al., "Analytical solution for estimating storage efficiency of geologic sequestration of CO2", International Journal of Greenhouse Gas Control, vol. 4, pp. 102-107, Jan. 2010 (6 pages).
Buchgraber et al., "A Study of Microscale Gas Trapping Using Etched Silicon Micromodels", Transport in Porous Media, vol. 95, pp. 647-668, Aug. 28, 2012 (22 pages).
Føyen, T., et al., "Increased CO2 storage capacity using CO2-foam", International Journal of Greenhouse Gas Control 96, pp. 1-11, 2020 (11 pages).
Khalil, F., et al., "Application of CO2-Foam as a Means of Reducing Carbon Dioxide Mobility", JCPT, vol. 45, No. 5, pp. 37-42, May 2006 (6 pages).
Emadi, Alireza, et al., "Mechanistic Study of Improved Heavy Oil Recovery by CO2-Foam Injection", Society of Petroleum Engineers, pp. 1-19, 2011 (19 pages).
Ibrahim, Ahmed Farid, et al., "CO2 Foam for Enhanced Oil Recovery Applications", IntechOpen, pp. 1-18 (19 pages).
Clark, Jennifer A., et al., "Carbon Sequestration through CO2 Foam-Enhanced Oil Recovery: A Green Chemistry Perspective", Engineering, May 14, 2018 (12 pages).
Rossen, William R., "Theory of Mobilization Pressure Gradient of Flowing Foams in Porous Media", Journal of Colloid and Interface Science, vol. 136, No. 1, pp. 38-53, Apr. 1990 (16 pages).
Gauglitz, P. A., et al., "Foam Generation in Porous Media", Society of Petroleum Engineers, SPE 75177, pp. 1-15, 2002 (15 pages).

\* cited by examiner

METHODOLOGY TO INCREASE CO2 SEQUESTRATION EFFICIENCY IN RESERVOIRS

BACKGROUND

Chemicals, such as water, methane, and carbon dioxide ($CO_2$) are often injected into reservoirs to increase oil and gas recovery in a technique known as enhanced oil recovery (EOR). $CO_2$ is introduced at the top of a reservoir using an injection well. A surfactant solution (foaming agent) may also be injected with the $CO_2$ to generate a foam using the $CO_2$. The injection is usually performed by either co-injecting the $CO_2$ with the surfactant solution or utilizing the surfactant-alternating-$CO_2$ gas (SAG) technique.

SUMMARY

This Summary is provided to introduce a selection of concepts that are further described in the Detailed Description. This Summary is not intended to identify key or essential features of the claimed subject matter, nor is it intended to be used as an aid in limiting the scope of the claimed subject matter.

A method for increasing $CO_2$ sequestration efficiency in depleted reservoirs by increasing injectivity may include the steps of introducing a surfactant solution into an upper portion of the reservoir through a first injection well and introducing $CO_2$ to a lower portion through a second injection well such that the $CO_2$ and surfactant solution migrate away from the wells and intimately intermingle to form $CO_2$-based foam in situ. The method may include the step of introducing the surfactant solution and $CO_2$ through the same injection well, where the surfactant solution is introduced to an upper portion of the reservoir and the $CO_2$ is introduced into a lower portion. The method may also include maintaining a reservoir pressure at a value less than the fracture pressure of the reservoir utilizing a pressure relief well.

Other aspects and advantages of the claimed subject matter will be apparent from the following description and the appended claims.

BRIEF DESCRIPTION OF DRAWINGS

This section describes specific embodiments in detail with reference to the accompanying figures. Where the figures include like elements between them, they are denoted by like reference numerals.

Figure 1:
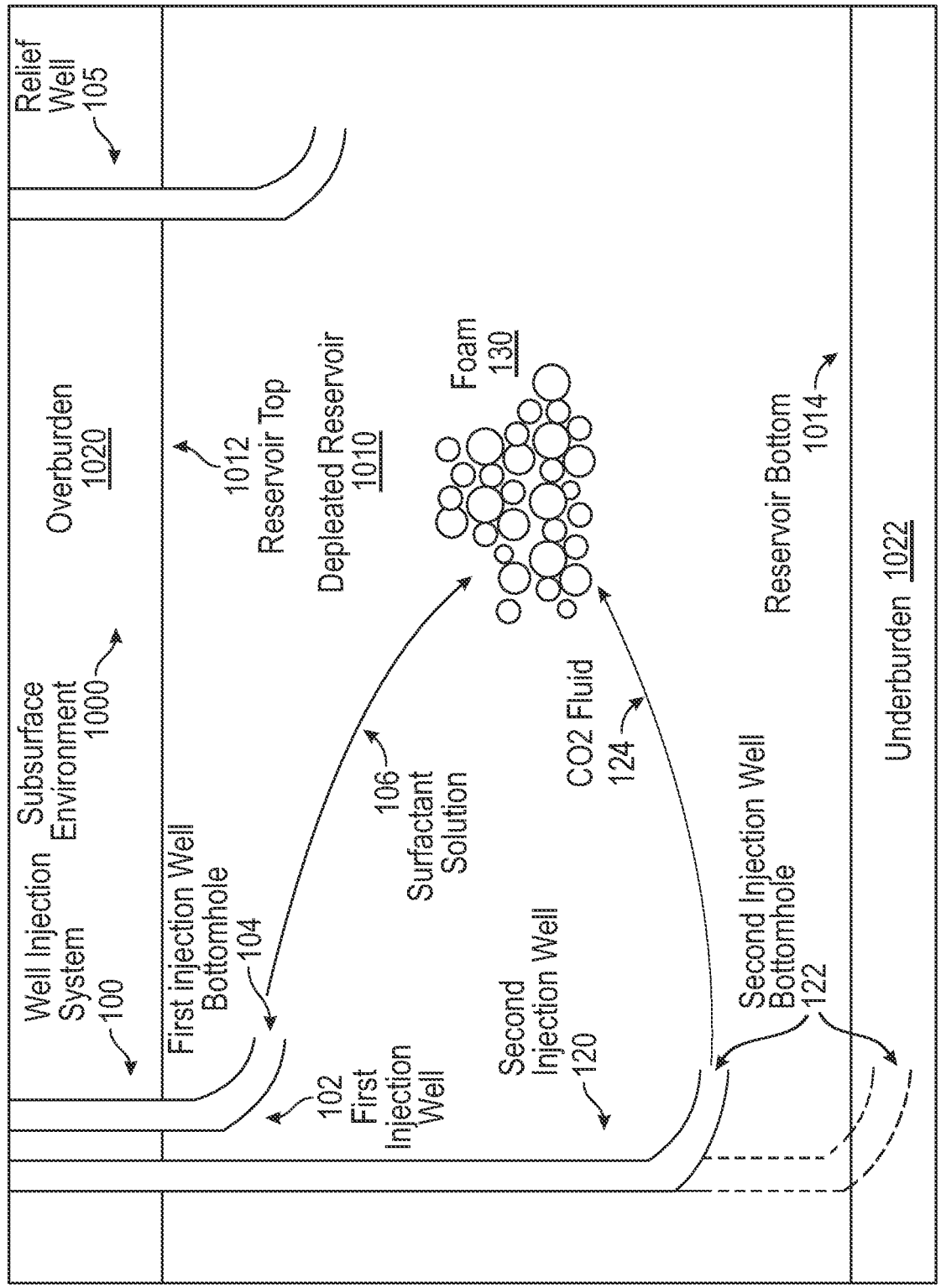
FIG. 1 is a diagram that illustrates a reservoir environment where the $CO_2$ and the surfactant solution are injected through adjacent wells at different depths in accordance with one or more embodiments.

Typically, down is toward or at the bottom and up is toward or at the top of the figure. "Up" and "down" are oriented relative to a local vertical direction. However, in the oil and gas industry, one or more activity may take place in deviated or horizontal wells. Therefore, one or more figure may represent an activity in vertical, approximately vertical, deviated, approximately horizontal, or horizontal wellbore configuration.

DETAILED DESCRIPTION

The injection of $CO_2$ into hydrocarbon-bearing formations (that is, reservoirs) is utilized to enhance oil and gas recovery. Recently, $CO_2$ injection has attracted some attention as a technique for carbon sequestration in depleted oil and gas reservoirs, that is, reservoirs where hydrocarbons may be present but are in unrecoverable amounts.

$CO_2$ sequestration into geological formations and depleted oil and gas reservoirs has emerged as a potential solution to control atmospheric $CO_2$ emissions; therefore, such methods may enhance the quality of the environment. Captured $CO_2$ is introduced via injection wells into depleted oil and gas reservoirs, coal seam beds, deep saline aquifers, or basaltic formations. The injected $CO_2$ fluid may be in the state of a gas, a liquid, a critical fluid, or a supercritical fluid, and may transition from one state to another during traversal and introduction. This method can use all states of $CO_2$, however the denser phases of $CO_2$, whether liquid or supercritical, are preferred. Both liquid and supercritical $CO_2$ have a similar density to those of formation fluids (brine; hydrocarbons). The similar density reduces the upward mobility of $CO_2$.

Various mechanisms ensure that the injected $CO_2$ is retained in the depleted reservoir. For example, the solubility mechanism of $CO_2$ into hydrocarbons facilitates the dissolution of $CO_2$ fluid into the formation water after prolonged contract. Other natural $CO_2$ retention mechanisms include structural or stratigraphical trapping due to geological aspects of the formations, capillary trapping due to the multiphase fluid flow in porous rocks, and mineral trapping, where $CO_2$ is permanently trapped by reaction with and conversion into formation materials.

However, traditional $CO_2$ sequestration processes have low efficiency. "Efficiency" is defined as the ratio of the volume of $CO_2$ trapped within the depleted reservoir to the pore volume of the depleted reservoir. Traditional $CO_2$ sequestration projects have demonstrated sequestration efficiencies of five percent or less. Poor sequestration efficiency is mainly due to the density of the $CO_2$ compared to other fluids found in the depleted reservoir, such as brine and hydrocarbons. The low specific gravity of $CO_2$ causes it to migrate upwards and collect at to the top of the depleted reservoir. At the boundary of the overburden, the buoyant $CO_2$ collects as a layer of a separated yet continuous fluid phase within the reservoir, making it hard to dissolve into the formation or its fluids.

$CO_2$ sequestration efficiency is an important operational parameter for the $CO_2$ sequestration process. The sequestration efficiency may be increased by decreasing $CO_2$ mobility within the reservoir. "$CO_2$ mobility" is defined as the rate at which the $CO_2$ in formation water rises to the top of the reservoir. One way to reduce $CO_2$ mobility is to increase the apparent viscosity of the $CO_2$. One technique to increase the apparent viscosity of the $CO_2$ is to introduce the $CO_2$ as part of a foam.

A foaming agent useful for forming a $CO_2$-based foam may be one or more of any $CO_2$-soluble or water-soluble surfactants. Foaming of the $CO_2$ during injection is accomplished by injecting dilute amounts of a surfactant dissolved in water with $CO_2$. The surfactant may be in a range of from about 0.05 wt % (weight percent) to 5.0 wt % of the surfactant solution.

Creating a foam utilizing a foaming agent makes the $CO_2$ phase discontinuous by creating gas bubbles that are separated by thin liquid films called lamellae. The lamellae separating the gas bubbles have surface active agents laid down on the interface between the gaseous and the aqueous phases. These agents act as stabilizers to prevent the liquid films from rupturing. The stable lamellae keep the bubbles— effectively gas pockets of $CO_2$—separated from one another. The $CO_2$ fluid is physically trapped in the foam structure. This permits pockets of $CO_2$ to be retained separately and in the proximity of brines and residual hydrocarbons, which may absorb $CO_2$, for longer periods than merely injecting bulk $CO_2$ fluid. The lamellae hinder the flow, or mobility, by providing resistance to flow. As well, the foam itself acts as a physical barrier against fluid transport through the depleted reservoir. The highly viscous and low mobility $CO_2$ then interacts with the formation water in the reservoir for a longer time period. This prolonged interaction increases the amount of dissolved $CO_2$ in the formation water, resulting in increased $CO_2$ sequestration efficiency in the depleted reservoir.

Traditional injection process is performed by either co-injection of the $CO_2$ with the surfactant solution or by the surfactant-alternating-$CO_2$ gas (SAG) method. These methods, however, generate foam immediately near the injection well increasing the pressure gradient. The increased pressure gradient lowers injectivity which reduces $CO_2$ sequestration efficiency. "Injectivity" is the flow rate that a formation can sustain and may vary on factors, such as, but not limited to, reservoir pressure, injection pressure, absolute permeability, relative permeability, formation thickness, and viscosity of injectant. As a consequence, either increased injection pressure to overcome the pressure gradient is required or reduced $CO_2$ sequestration as a reduced amount of $CO_2$ may be introduced lowered injectivity which reduces $CO_2$ sequestration efficiency.

A useful method of $CO_2$ sequestration not only permits the introduction of both $CO_2$ and surfactant solution into a reservoir through one or more injection wells, but also avoids the reduced relative injectivity caused by the increased pressure gradient that forms near the injection well by the foaming of the $CO_2$ near the injection well. Such a method would increase the injectivity and permit greater amount of $CO_2$ sequestration and storage in a depleted reservoir by preventing its blockage at the points of injection.

The proposed method involves introducing a surfactant solution in the upper portion of the depleted reservoir and introducing a $CO_2$ fluid near the lower portion of the depleted reservoir. The surfactant solution has a similar density to water, which causes the surfactant solution to migrate downwards as it traverses deeper into the depleted reservoir. The $CO_2$ has a reduced density compared to water, which causes the introduced $CO_2$ fluid to migrate upwards as it traverses deeper into the depleted reservoir. The introduced $CO_2$ and the surfactant solution eventually interact in the depleted reservoir and form a foam in situ a distance from both injection points. The pore structure of the reservoir itself contributes to the intimate intermixing of the $CO_2$ fluid with the surfactant solution. The foam is formed away from the introduction points of both the surfactant solution and the $CO_2$ fluid so as to not hinder introduction through either point. This avoids forming a high-pressure gradient close to the point of introduction, such as when a foam forms close by. In one or more embodiments, the in situ foam generation may occur at a distance of 5 meters or greater from the points of injection in the reservoir.

The minimum pressures range required to create a foam using $CO_2$ is in a range of from about 0.8 to 1.4 pounds per square inch per foot (psi/ft).

However, the $CO_2$ fluid and the surfactant solution traverse pathways depending on the fractures and high-permeability zones found in the depleted reservoir. To ensure that the $CO_2$ fluid and the surfactant solution interact, the migration pathway of the $CO_2$ and the surfactant solution in the depleted reservoir may be predicted utilizing reservoir simulators that are known to a person of ordinary skill in the art and are commonly used in the oil and gas industry. In one or more embodiments, the depleted reservoir may be treated with treatment fluid to block or hinder heterogeneous aspects of a reservoir. In doing so, it the overall permeability of the reservoir is reduced as some voids will be filled with the treatment fluid; however, it also makes the reservoir more homogenous and favorable as a storage medium and to the formation of the foam in situ by preventing fluid bypass through high conductivity regions.

In one or more embodiments, the $CO_2$ fluid and the surfactant solution may be injected at different depths using separate adjacent wells. In one or more embodiments, the $CO_2$ fluid and the surfactant solution may be introduced from the same well but at different depths. The $CO_2$ fluid is introduced proximate to the bottom of the depleted reservoir, such as in the lower portion of the reservoir. The surfactant solution is introduced proximate to the top of the depleted reservoir, such as in the upper portion of the reservoir. The $CO_2$ fluid and the surfactant solution may be injected concurrently into the depleted reservoir. The $CO_2$ fluid and the surfactant solution may also be injected in series, such as where one fluid is introduced and then a second fluid is introduced. In some instances, there may be a period between the first introduction and the second introduction such that the introduction of the first fluid is competed and a period of time elapses before the second fluid is introduced.

To achieve suitable foam quality, the ratio of surfactant solution to $CO_2$ fluid introduced into the reservoir may be in a ratio of at least 1:1. "Foam quality" is measured as the volumetric flow rate of $CO_2$ fluid to the total volumetric flow rate of $CO_2$ fluid and surfactant solution injected. Foam quality can be expressed as the ratio of the volumetric fluid flow rate to the total fluid flow rate. However, the ratio of $CO_2$ to surfactant solution utilized for a particular reservoir may vary on factors, such as, but not limited to, the formation type and the surfactant used. The $CO_2$ fluid may be provided in excess with respect to the surfactant solution, such as about 9 times or more in volumetric flow rate than the surfactant solution. For example, the $CO_2$ in consolidated sandstone or carbonates may be in a range of from about 50% to 80% of the total fluid volume. In another example, the range of $CO_2$ in an unconsolidated sand may range of from about 50% to 99% of the total fluid volume. In one or more embodiments, the volumetric flow rate of surfactant solution to $CO_2$ fluid may be in a range of from about 1:1 to 1:9.5.

Further, the specific type of a reservoir formation, such as sandstone, limestone, and shale, may determine the specific surfactant utilized in the surfactant solution. Surfactants include those that are nonionic, anionic, cationic, and zwitterionic. For example, formations containing carbonates usually have positively charged surfaces; therefore, nonionic, or cationic surfactants may be useful in such formations. Sandstone formations usually have negatively charged surfaces; therefore, non-ionic, or anionic surfactants may be useful in such formations.

FIG. 1 is a diagram that illustrates a reservoir environment in accordance with one or more embodiments. The subsurface environment 1000 includes depleted reservoir 1010 having a reservoir top 1012 and a reservoir bottom 1014. Above the reservoir top 1012 is a fluid-impenetrable overburden 1020, which is part of the subsurface environment 1000. Below the reservoir bottom 1014 is the underburden 1022, which is also part of the subsurface environment 1000.

Traversing through subsurface environment is well injection system 100. Well injection system 100 includes first injection well 102 and second injection well 120. The bottomhole 104 of the first injection well 102 is positioned proximate to the reservoir top 1012 within the depleted reservoir 1010. The bottomhole 122 of the second injection well 120 is positioned proximate to the reservoir bottom 1014 within the depleted reservoir 1010. In one or more embodiments, if the underburden 1022 is porous or permits $CO_2$ migration, the second injection well 120 transverses the reservoir bottom 1014 where the second injection well bottomhole 122 is positioned in the underburden 1022.

In depleted reservoir environments containing formation water and residual hydrocarbons, the greater relative density of surfactant solution causes it to migrate downwards towards the reservoir bottom 1014 direction. The lesser relative density of the $CO_2$ fluid causes it to migrate upwards towards the reservoir top 1012 direction.

FIG. 1 shows surfactant solution 106 being introduced into the depleted reservoir 1010 and traversing into it for some distance away from the first injection well bottomhole 104 (arrow). As well, $CO_2$ fluid 124 is introduced into the depleted reservoir 1010 and traversing into it for some distance away from the second injection well bottomhole 122 (arrow). Where the surfactant solution 106 and the $CO_2$ fluid 124 intimately intermix within the depleted reservoir 1010 and a foam 130 forms. This in situ formed foam 130 is positioned well away from either of the injection wells 102, 122. For example, the formed foam 130 is at least 5 meters away from either of the injection wells 102, 122.

It is important to note that the well injection system does not include a recovery or production well. The depleted reservoirs used in this method have already had productive hydrocarbons extracted. The depleted reservoirs are utilized for sequestration of carbon dioxide and not hydrocarbon exploitation.

However, in one or more embodiments, a relief well 105 is added to the depleted reservoir to release reservoir pressure and to maintain the reservoir pressure at a value less than the fracture pressure of the reservoir. Fracture pressure is typically calculated before oil and gas drilling activities commence; therefore, the fracture pressure is known before implementing this method or could be calculated using known techniques. In one or more embodiments, the reservoir pressure is maintained at a value that is at least 10% less than the fracture pressure of the depleted reservoir. In such an instance, the relief well 105 may be used to decrease the reservoir pressure if the reservoir pressure increases to a value greater than the 10% limit. However, a person of ordinary skill in the art will appreciate that the method may still be utilized at reservoir pressure values greater than the proposed 90% limit of the fracture pressure of the reservoir.

Although both injection wells of wellbore system 100 and relief well 105 in FIG. 1 are essentially shown as vertical wells the configuration of an injection well is not so limited. The configuration of any injection well may be vertical, approximately vertical, deviated, approximately horizontal, horizontal, and combinations thereof.

Figure 2:
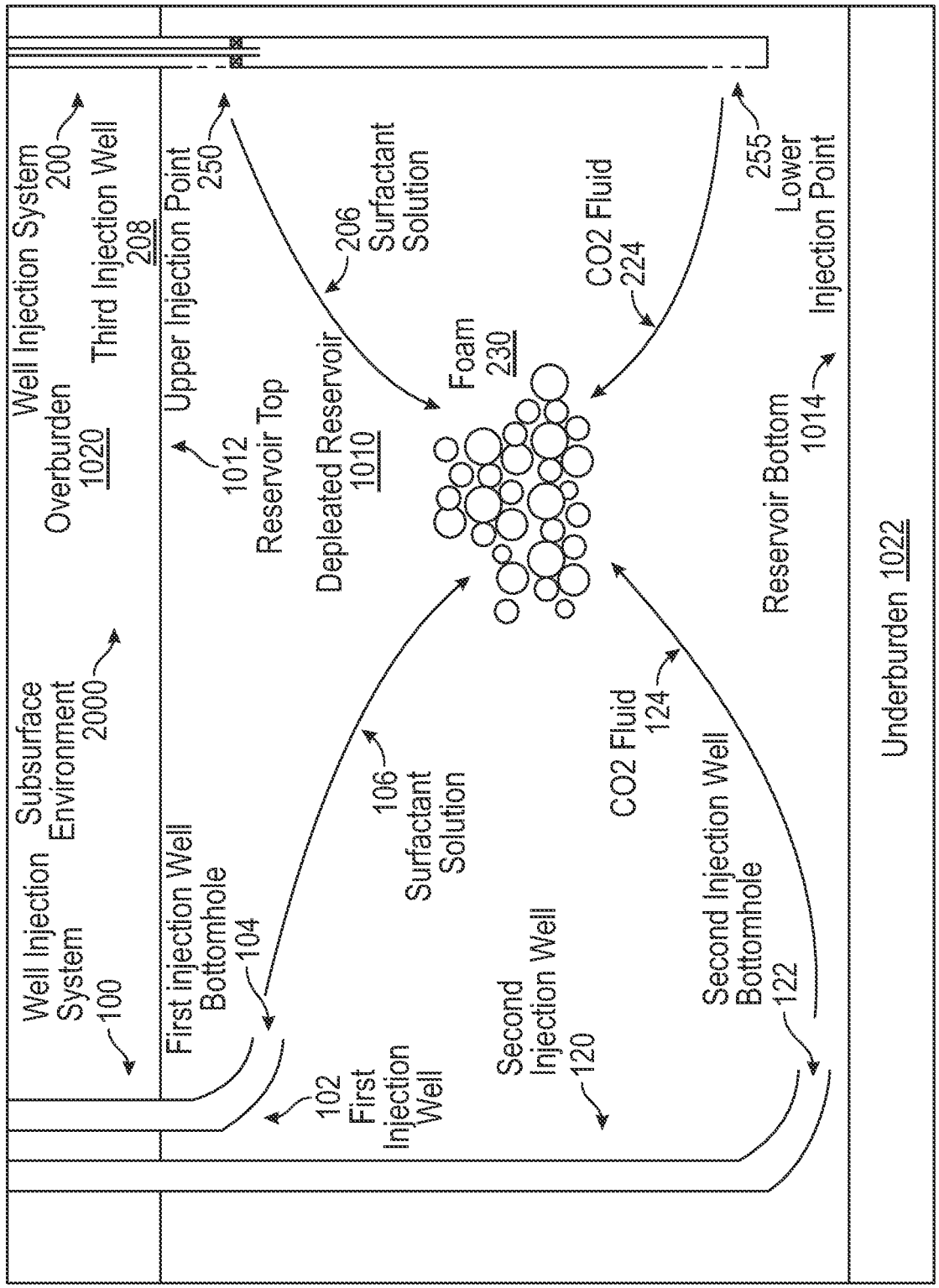
FIG. 2 is a diagram that illustrates a reservoir environment where the $CO_2$ and the surfactant solution is injected through the same well at different depths in accordance with one or more embodiments.

FIG. 2 is a diagram that illustrates a reservoir environment in accordance with one or more embodiments. Subsurface environment 2000 of FIG. 2 includes many of the same elements as subsurface environment 1000 of FIG. 1, including injection well system 100; therefore, those similar aspects are not repeated for the sake of brevity.

Subsurface environment of FIG. 2 is shown with a well injection system 200. Well injection system 200 includes a third injection well 208 that traverses the subsurface environment 2000 into the depleted reservoir 1010. The third injection well 208 includes both an upper injection point 250 positioned proximate to the reservoir top 1012 in the depleted reservoir 1010 and a lower injection point 255 positioned proximate to the reservoir bottom 1014 in the depleted reservoir 1010.

FIG. 2 shows surfactant solution 106 and $CO_2$ fluid 124 being introduced into the depleted reservoir 1010 as in FIG. 1. Well injection system 200 also introduces surfactant solution 206 through upper injection point 250 and $CO_2$ fluid 224 through lower injection point 255, where they both traverse some distance into depleted reservoir 1010. The surfactant solution 206 and the $CO_2$ fluid 224 are introduced from well injection system 200 using coiled tubing and isolation packers. Other similar techniques are known to a person of ordinary skill in the art Although showing both surfactant solution 106, surfactant solution 206, $CO_2$ fluid 124, and $CO_2$ fluid 224 effectively combining to form foam 230, such may not be the case in all instances. The two sets of fluids may form two different sets of foams in situ.

For one or more embodiments, the surfactant solution is an aqueous solution comprising water. Water may comprise one or more known compositions of water, including distilled; condensed; filtered or unfiltered fresh surface or subterranean waters, such as water sourced from lakes, rivers or aquifers; mineral waters; gray, brown, black, and blue waters; run-off, storm or waste water; potable or non-potable waters; brackish waters; synthetic or natural sea waters; synthetic or natural brines; formation waters; production water; boiler feed water; condensate water; and combinations thereof. The water may include impurities, including, but not limited to, ions, salts, minerals, polymers, organic chemicals, inorganic chemicals, detritus, flotsam, debris, and dead and living biological life forms, so long as the purpose and performance of the surfactant solution is not mitigated or otherwise detrimentally affected.

In one or more embodiments, the surfactant includes an anionic surfactant. The anionic surfactant may include, but is not limited to, alpha olefin sulfonates, internal olefin sulfonates, sodium bis(2-ethylhexyl) sulfosuccinate (AOT), sodium dodecyl sulfate (SDS), and combinations thereof.

In one or more embodiments, the surfactant includes a cationic surfactant. The anionic surfactant may include but is not limited to, cetyltrimethylammonium bromide (CTAB), dodecyltrimethylammonium bromide (DTAB), and polyoxyethylene cocoalkylamines, and combinations thereof.

In one or more embodiments, the surfactant includes a non-ionic surfactant. The non-ionic surfactant may include, but is not limited to, alcohol ethoxylates and combinations thereof.

In one or more embodiments, the surfactant includes a zwitterionic or amphoteric surfactant. The zwitterionic surfactant may include, but is not limited to, alkyl amines, cocamidopropyl betaine (CAPB), cocamidopropyl hydroxysultaine, lauryl and myristyl betaines, and combinations thereof.

In one or more embodiments, the surfactant is present in a concentration in the surfactant solution in a range of from about 0.05 to 5.0 wt. % (weight percent). In such embodiments, the surfactant is present in a concentration in the surfactant solution may have a lower limit of one of 0.05, 0.2, 0.3, 0.5, 0.7, 0.9, 1.0, 1.2, and 1.5 wt. % and an upper limit of one of 0.5, 0.7, 0.9, 1.0, 1.2, 1.5, 1.7, 1.8, 1.9, and 5.0 wt. %, where any lower limit may be paired with any mathematically compatible upper limit.

In one or more embodiments, the method includes introducing the amount of surfactant solution to the amount of $CO_2$ in a volume:volume ratio in a range of from about 1:1 to 1:9.5 for consolidated porous formation media, like sandstones and carbonates, and from about 1:1 to 1:3 for unconsolidated porous media.

In one or more embodiments, the $CO_2$ is introduced proximate to the bottom of the depleted reservoir in a gaseous state. In one or more embodiments, the $CO_2$ is introduced proximate to the bottom of the depleted reservoir in a liquid state. In one or more embodiments, the $CO_2$ is introduced proximate to the bottom of the depleted reservoir as a critical fluid. In one or more embodiments, the $CO_2$ is introduced proximate to the bottom of the depleted reservoir as a supercritical fluid.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims. Thus, particular implementations of the subject matter have been described. Other implementations are within the scope of the following claims.

Although only a few example embodiments have been described in detail, those skilled in the art will readily appreciate that many modifications are possible in the example embodiments without materially departing from the described scope. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph (f), for any limitations of any of the claims, except for those in which the claim expressly uses the words 'means for' together with an associated function.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and all grammatical variations thereof are each intended to have an open, non-limiting meaning that does not exclude additional elements or steps.

What is claimed:

1. A method for sequestering $CO_2$ in a depleted reservoir, comprising:
   providing an injection well traversing a subsurface into a depleted reservoir, where the injection well has a first injection point and a second injection point, where the first injection point is proximate to a top of and within the depleted reservoir and the second injection point is proximate to a bottom of and within the depleted reservoir;
   introducing a surfactant solution into the depleted reservoir via the first injection point;
   introducing a $CO_2$ fluid concurrently into the depleted reservoir via the second injection point; and
   maintaining a reservoir pressure to less than a determined fracture pressure of the depleted reservoir introduction of the surfactant solution and the $CO_2$ fluid;
   where the concurrently introduced surfactant solution and $CO_2$ fluid intermingle and produce a $CO_2$-based foam within the depleted reservoir.

2. The method of claim 1, where a surfactant in the surfactant solution is in a concentration in a range of from about 0.05 wt % to 5.0 wt. %.

3. The method of claim 1, where a surfactant of the surfactant solution is selected from the group consisting of alpha olefin sulfonates, internal olefin sulfonates, sodium bis(2-ethylhexyl) sulfosuccinate (AOT), sodium dodecyl sulfate (SDS), and combinations thereof.

4. The method of claim 1, where a surfactant of the surfactant solution is selected from the group consisting of cetyltrimethylammonium bromide (CTAB), dodecyltrimethylammonium bromide (DTAB), and polyoxyethylene cocoalkylamines, and combinations thereof.

5. The method of claim 1, where a surfactant of the surfactant solution is selected from the group consisting of alcohol ethoxylates.

6. The method of claim 1, where a surfactant of the surfactant solution is selected from the group consisting of alkyl amines, cocamidopropyl betaine (CAPB), cocamidopropyl hydroxysultaine, lauryl and myristyl betaines, and combinations thereof.

7. The method of claim 1, where the CO2 fluid is in a range of from about 50% to 99% of a total fluid volume.

8. The method of claim 1, where the volume:volume ratio of the surfactant solution to the CO2 fluid in a range of from about 1:1 to 9.5:1.

9. The method of claim 1, where the surfactant solution and the CO2 are injected from the injection well.

10. The method of claim 1, where the surfactant solution is introduced into the depleted reservoir from a first well that has first injection point proximate to a top of and within the depleted reservoir and the CO2 fluid is introduced into the depleted reservoir from a second well that has the second injection point proximate to a bottom of and within the depleted reservoir.

11. The method of claim 1, where the reservoir pressure is maintained to 90% of the fracture pressure of the depleted reservoir.

12. The method of claim 1, where surfactant solutions are injected into the depleted reservoir via the first injection point.

13. The method of claim 1, where the second injection point is positioned in an underburden.

\* \* \* \* \*